United States Patent
Schmidt et al.

(10) Patent No.: US 10,744,979 B2
(45) Date of Patent: Aug. 18, 2020

(54) SENSOR APPARATUS

(71) Applicant: Ford Global Technologies, LLC, Dearborn, MI (US)

(72) Inventors: David Schmidt, Dearborn, MI (US); Scott A. Black, Farmington Hills, MI (US); Katherine Jo Ralston, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 324 days.

(21) Appl. No.: 15/623,476

(22) Filed: Jun. 15, 2017

(65) Prior Publication Data
US 2018/0361997 A1     Dec. 20, 2018

(51) Int. Cl.
| | |
|---|---|
| *B60S 1/56* | (2006.01) |
| *G01S 13/931* | (2020.01) |
| *G02B 27/00* | (2006.01) |
| *B60R 11/04* | (2006.01) |
| *G01S 7/481* | (2006.01) |
| *G01S 17/931* | (2020.01) |
| *B60S 1/50* | (2006.01) |

(Continued)

(52) U.S. Cl.
CPC .............. *B60S 1/56* (2013.01); *B60R 11/04* (2013.01); *B60S 1/50* (2013.01); *B60S 1/52* (2013.01); *B60S 1/54* (2013.01); *G01S 7/4811* (2013.01); *G01S 7/4813* (2013.01); *G01S 7/4865* (2013.01); *G01S 13/931* (2013.01); *G01S 17/10* (2013.01); *G01S 17/931* (2020.01); *G02B 27/00* (2013.01); *G01S 2007/027* (2013.01); *G01S 2007/4043* (2013.01); *G01S 2007/4977* (2013.01)

(58) Field of Classification Search
CPC ...... B60S 1/54; B60S 1/56; B60S 1/52; B60S 1/0848; B60S 1/46; B60S 1/50; B60S 1/38; B60S 1/524
USPC ......... 134/95.3, 37, 34, 102.1, 123, 18, 198, 134/99.1, 102.3, 94.1; 359/509, 507, 359/511; 15/313, 250.001, 302; 239/284.2, 284.1
See application file for complete search history.

(56) References Cited

U.S. PATENT DOCUMENTS

| | | | |
|---|---|---|---|
| 3,469,088 A | * | 9/1969 | Coleman ................... B60S 1/60 239/284.2 |
| 4,088,358 A | * | 5/1978 | Hirsch .................... B60S 1/603 239/284.2 |

(Continued)

FOREIGN PATENT DOCUMENTS

GB      2562358 A     11/2018

OTHER PUBLICATIONS

Search Report from United Kingdom Intellectual Property Office dated Dec. 13, 2018 regarding Application No. GB1809714.7 (3 pages).

*Primary Examiner* — David G Cormier
*Assistant Examiner* — Thomas Bucci
(74) *Attorney, Agent, or Firm* — Frank A. MacKenzie; Bejin Bieneman PLC

(57) ABSTRACT

An apparatus includes a sensor window, a deflector fixedly positioned to deflect a first airflow travelling in an opposing direction to a direction of travel of the sensor window to one or more directions tangential to the sensor window, and a nozzle fixedly positioned to direct a second airflow through the nozzle to a space between the sensor window and the deflector.

18 Claims, 5 Drawing Sheets

(51) Int. Cl.
  *B60S 1/52*       (2006.01)
  *B60S 1/54*       (2006.01)
  *G01S 7/4865*     (2020.01)
  *G01S 17/10*      (2020.01)
  *G01S 7/40*       (2006.01)
  *G01S 7/02*       (2006.01)
  *G01S 7/497*      (2006.01)

(56) References Cited

U.S. PATENT DOCUMENTS

| | | | | |
|---|---|---|---|---|
| 4,134,612 A * | 1/1979 | Nelson | | B60R 1/0602 15/313 |
| 4,196,930 A * | 4/1980 | Busche | | B60R 1/06 296/91 |
| 4,505,001 A * | 3/1985 | Fasolino | | B60S 1/38 15/250.002 |
| 4,538,851 A * | 9/1985 | Taylor | | B60R 1/06 296/180.1 |
| 4,561,732 A * | 12/1985 | Japes | | B60R 1/0602 359/509 |
| 4,928,580 A * | 5/1990 | McIntyre | | B60R 1/0602 454/123 |
| 5,096,287 A * | 3/1992 | Kakinami | | B60R 1/12 352/131 |
| 5,140,719 A * | 8/1992 | Cowan | | B60S 1/54 15/250.001 |
| 5,419,005 A | 5/1995 | Mori | | |
| 6,290,361 B1 * | 9/2001 | Berzin | | B60R 1/0602 15/250.003 |
| 6,527,000 B1 * | 3/2003 | Randmae | | B08B 3/024 134/102.1 |
| 6,527,871 B1 * | 3/2003 | Hanson | | A42B 3/26 134/18 |
| 6,554,210 B2 * | 4/2003 | Holt | | B05B 7/08 239/284.2 |
| 7,040,328 B2 * | 5/2006 | Woodard | | B08B 3/02 134/102.3 |
| 7,140,740 B1 * | 11/2006 | Cooper | | B60R 1/0602 359/509 |
| 8,358,928 B2 * | 1/2013 | Appel | | G03B 17/08 396/535 |
| 8,497,466 B2 * | 7/2013 | Martelli | | B23Q 17/20 250/222.1 |
| 8,899,761 B2 * | 12/2014 | Tonar | | B60S 1/56 359/511 |
| 9,057,528 B2 * | 6/2015 | Browne | | B60J 9/04 |
| 9,083,864 B2 * | 7/2015 | Reed | | G03B 17/02 |
| 9,126,546 B2 * | 9/2015 | Bochenek | | B60R 11/04 |
| 2003/0155001 A1 * | 8/2003 | Hoetzer | | B60S 1/0822 134/37 |
| 2006/0193049 A1 * | 8/2006 | Chen | | B60R 1/0602 359/509 |
| 2007/0183039 A1 * | 8/2007 | Irvin | | B60R 1/0602 359/507 |
| 2007/0273971 A1 * | 11/2007 | Waldmann | | B60R 1/0602 359/509 |
| 2008/0285132 A1 * | 11/2008 | O'Kane | | G02B 27/0006 359/509 |
| 2009/0250533 A1 * | 10/2009 | Akiyama | | B60S 1/381 239/284.1 |
| 2011/0023915 A1 | 2/2011 | McConnell | | |
| 2011/0292212 A1 * | 12/2011 | Tanabe | | B05B 1/08 348/148 |
| 2012/0242833 A1 * | 9/2012 | Yamaguchi | | B62D 35/007 348/148 |
| 2014/0060582 A1 * | 3/2014 | Hartranft | | G02B 27/0006 134/18 |
| 2014/0104426 A1 * | 4/2014 | Boegel | | B60R 1/00 348/148 |
| 2015/0183406 A1 * | 7/2015 | Tanaka | | B60S 1/56 134/99.1 |
| 2015/0277111 A1 * | 10/2015 | Bell | | G02B 27/0006 359/509 |
| 2015/0296108 A1 * | 10/2015 | Hayakawa | | B60R 1/00 348/148 |
| 2015/0353024 A1 * | 12/2015 | Cooper | | B60R 11/04 348/148 |
| 2016/0209645 A1 | 7/2016 | Britton | | |
| 2016/0375876 A1 * | 12/2016 | Silc | | B60S 1/56 134/37 |
| 2017/0313286 A1 * | 11/2017 | Galera | | B60S 1/52 |

* cited by examiner

SENSOR APPARATUS

BACKGROUND

Vehicles, such as autonomous vehicles, typically include a variety of sensors. Some sensors detect internal states of the vehicle, for example, wheel speed, wheel orientation, and engine and transmission variables. Some sensors detect the location and/or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

Figure 1:
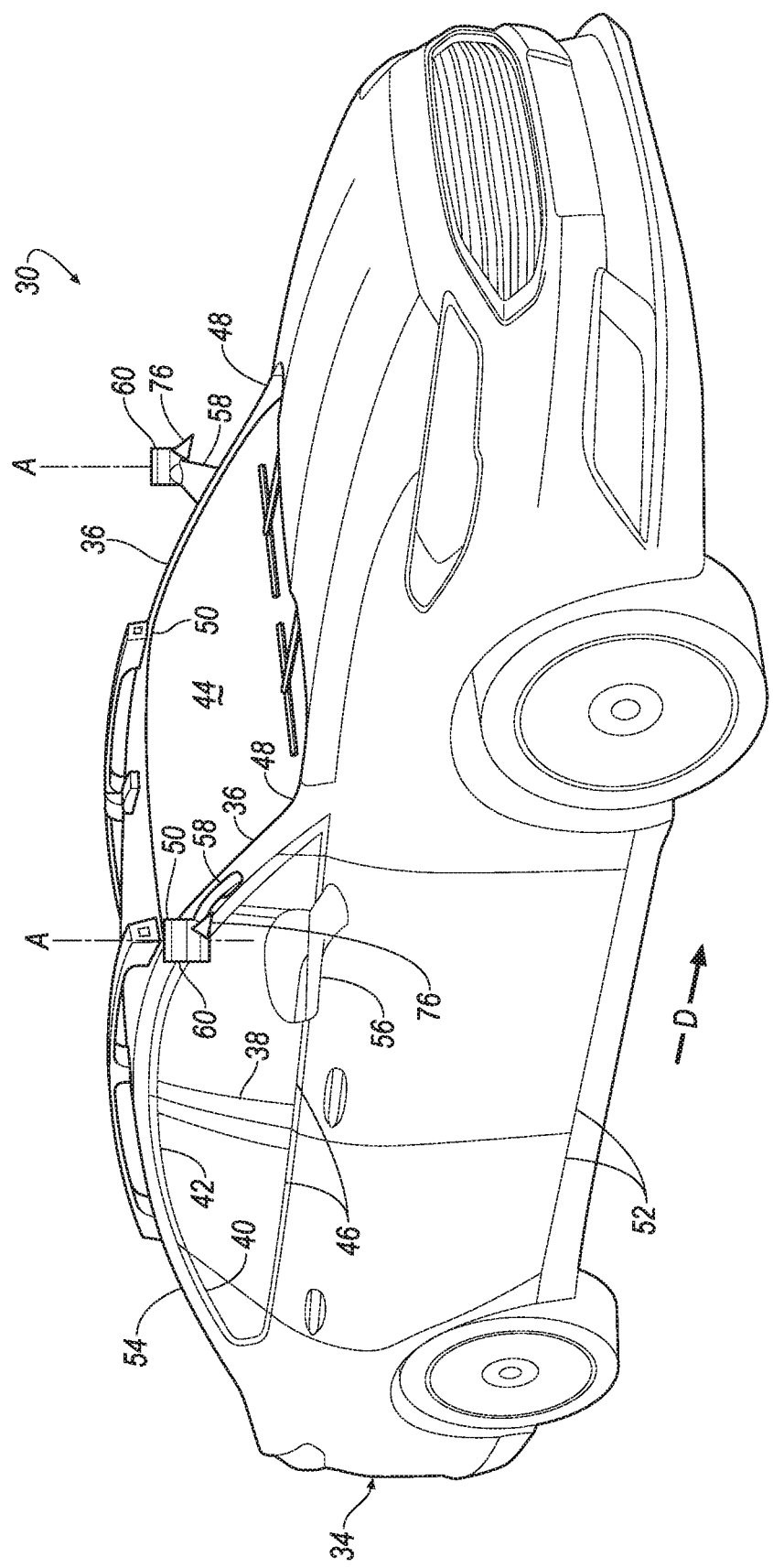
FIG. 1 is a perspective view of an example vehicle.

An apparatus includes a sensor window, a deflector fixedly positioned to deflect a first airflow travelling in an opposing direction to a direction of travel of the sensor window to one or more directions tangential to the sensor window, and a nozzle fixedly positioned to direct a second airflow through the nozzle to a space between the sensor window and the deflector.

The deflector may have an outer surface and an inner surface, and the outer surface may be shaped to deflect airflow from the opposing direction to the one or more tangential directions. The nozzle may be positioned to direct the second airflow at the inner surface, and the inner surface may be shaped to deflect the second airflow to the space between the sensor window and the deflector. The deflector may be positioned to direct the second airflow between the sensor window and the first airflow.

The deflector may be wedge-shaped.

The deflector may include an edge and two sides extending transverse to each other from the edge. The sides may each have a triangular shape and may be reflectionally symmetrical about the edge. The sensor window may be cylindrical and may define an axis, and the edge may define a line extending through the axis.

The apparatus may include a filter fluidly connected to the nozzle, and a compressor fluidly connected to the nozzle. The apparatus may include a computer in communication with the compressor, and the computer may be programmed to instruct the compressor to generate the second airflow through the nozzle at an airflow speed based on a speed of the sensor window in the direction of travel.

The nozzle may be an air nozzle, and the apparatus may include a liquid nozzle fixed relative to the sensor window and positioned to eject liquid into the second airflow. The liquid nozzle may be positioned to eject liquid into the space between the sensor window and the deflector.

The apparatus may include a sensor attached to the sensor window, and the sensor may have a field of view through the sensor window, and the deflector may be positioned outside the field of view. The deflector may be a first deflector, and the apparatus may include a second deflector fixedly positioned to deflect a third airflow travelling in the opposing direction to the direction of travel of the sensor window to one or more directions tangential to the sensor window, and the second deflector may be positioned outside the field of view, and the field of view may be between the first deflector and the second deflector.

An apparatus includes a sensor window defining a direction of travel; a wedge spaced from the sensor window and positioned in the direction of travel from and one of above and below the sensor window, the wedge including an outer surface facing the direction of travel and an inner surface facing opposite the direction of travel; and a nozzle aimed at the inner surface.

The sensor window may be cylindrical and may define an axis extending vertically.

The apparatus may include a filter fluidly connected to the nozzle, and a compressor fluidly connected to the nozzle. The apparatus may include a computer in communication with the compressor, and the computer may be programmed to instruct the compressor to generate airflow through the nozzle at an airflow speed based on a speed of the sensor window in the direction of travel.

The nozzle may be an air nozzle, and the apparatus may include a liquid nozzle aimed at a space between the wedge and the sensor window.

The apparatus may include a sensor attached to the sensor window, and the sensor may have a field of view through the sensor window, and the wedge may be positioned outside the field of view.

The cleaning system described herein cleans the sensor window of a sensor assembly and may thus allow the sensor, after being completely or partly soiled or covered with dirt, water, ice, condensation, etc., to continue to provide useful data and/or to more accurately detect an external environment through which a vehicle moves. The cleaning system is positioned relative to the rest of the vehicle so that the cleaning system will not block the field of view of the sensor nor of a human driver of the vehicle who is looking through the windshield or a window of the vehicle. The cleaning system is efficient because the cleaning system takes advantage of airflow resulting from the vehicle traveling, reducing the need to use liquid and/or compressed gas for cleaning the sensor window.

With reference to FIG. 1, a vehicle 30 may be an autonomous, semi-autonomous, or nonautonomous vehicle. A computer 32 can be configured to operate the vehicle 30 independently of the intervention of a human driver, completely or to a lesser degree. The computer 32 may be programmed to operate the propulsion, brake system, steering, and/or other vehicle systems. For the purposes of this disclosure, autonomous operation means the computer 32 controls the propulsion, brake system, and steering; semi-autonomous operation means the computer 32 controls one or two of the propulsion, brake system, and steering and a human driver controls the remainder; and nonautonomous operation means the human driver controls the propulsion, brake system, and steering.

With reference to FIG. 1, a body 34 of the vehicle 30 may include A pillars 36, B pillars 38, C pillars 40, and roof rails 42. The A pillars 36 may extend between a windshield 44 and windows 46 and from a first end 48 at a bottom of the windshield 44 to a second end 50 at a top of the windshield 44. The B pillars 38 may extend between the windows 46 of adjacent doors 52. The C pillars 40 may extend between the windows 46 and a backlite 54. The body 34 may also include D pillars (not shown) if the vehicle 30 is, e.g., an SUV, crossover, minivan, or station wagon, in which case the C pillars 40 extend between the windows 46 of rear doors 52 and rear left and right windows 46, and the D pillars extend between the rear right and left windows 46 and the backlite 54. The roof rails 42 extend along the windows 46 from the A pillar 36 to the B pillar 38 to the C pillar 40.

The windshield 44 and windows 46 may be formed of any suitably durable transparent material, including glass such as laminated, tempered glass or plastic such as Plexiglas or polycarbonate. The windshield 44 is located adjacent the A pillars 36.

With continued reference to FIG. 1, the vehicle 30 may include side-view mirrors 56. The side-view mirrors 56 may be located on the front doors 52 or on the body 34 near the bottom of the windshield 44. The side-view mirrors 56 may be visible to a human driver through the windows 46 and provide a reflected view of a vehicle-rearward direction to the driver.

Figure 4:
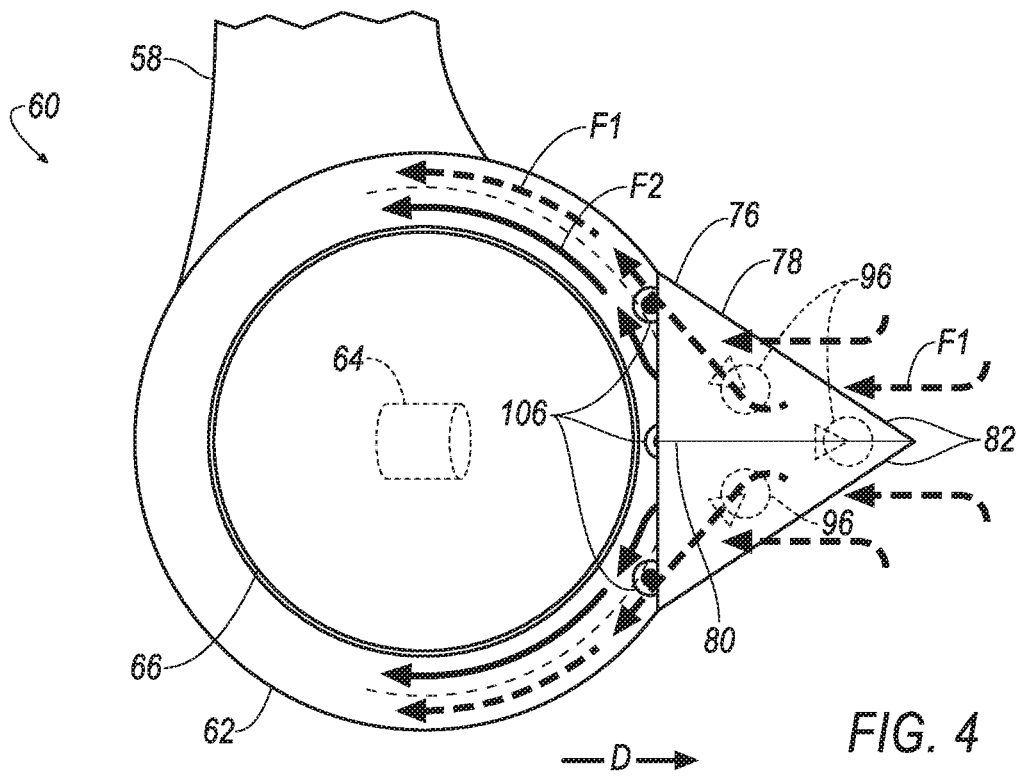
FIG. 4 is a top view of the sensor assembly.

With reference to FIGS. 1 and 4, a sensor arm 58 extends from one of the pillars 36, 38, 40 of the vehicle 30, e.g., the A pillar 36, to a sensor assembly 60. The sensor arm 58 may be located between the ends 48, 50 of the A pillar 36, that is, spaced from the bottom of the windshield 44 and from the top of the windshield 44, that is, spaced from the first end 48 and from the second end 50. The sensor arm 58 may be attached to a mount 62 of the sensor assembly 60 that supports a sensor 64. The sensor arm 58 may have a tubular or other hollow shape, that is, a cavity may extend through the sensor arm 58. The cavity may allow wiring, tubes, etc., to pass through the sensor arm 58 while being shielded from the outside environment.

With reference to FIGS. 1-4, the sensor assembly 60 is supported by the sensor arm 58. The sensor assembly 60 may have a cylindrical shape with a top surface 66 and a side surface 68. The top surface 66 faces up, that is, in a vehicle-upward direction (i.e., toward a roof or top of the vehicle 30). The side-view mirrors 56 may be located below the sensor assemblies 60, that is, in a vehicle-downward direction from the sensor assemblies 60 (i.e., toward a floor or bottom of the vehicle 30). The cylindrical shape of the sensor assembly 60 defines an axis A, which runs through a center of the sensor assembly 60. The axis A is oriented vertically relative to the vehicle 30.

Figure 2:
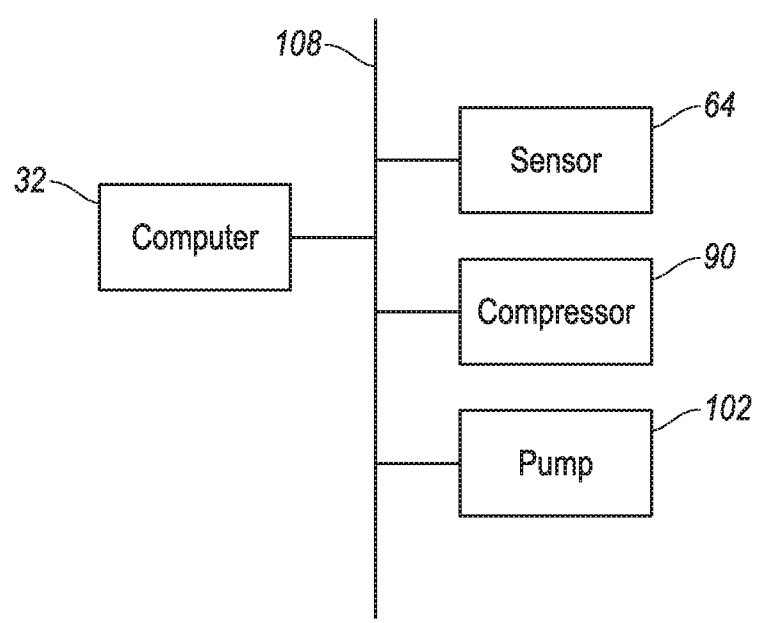
FIG. 2 is a block diagram of an example control system of the vehicle.
Figure 3:
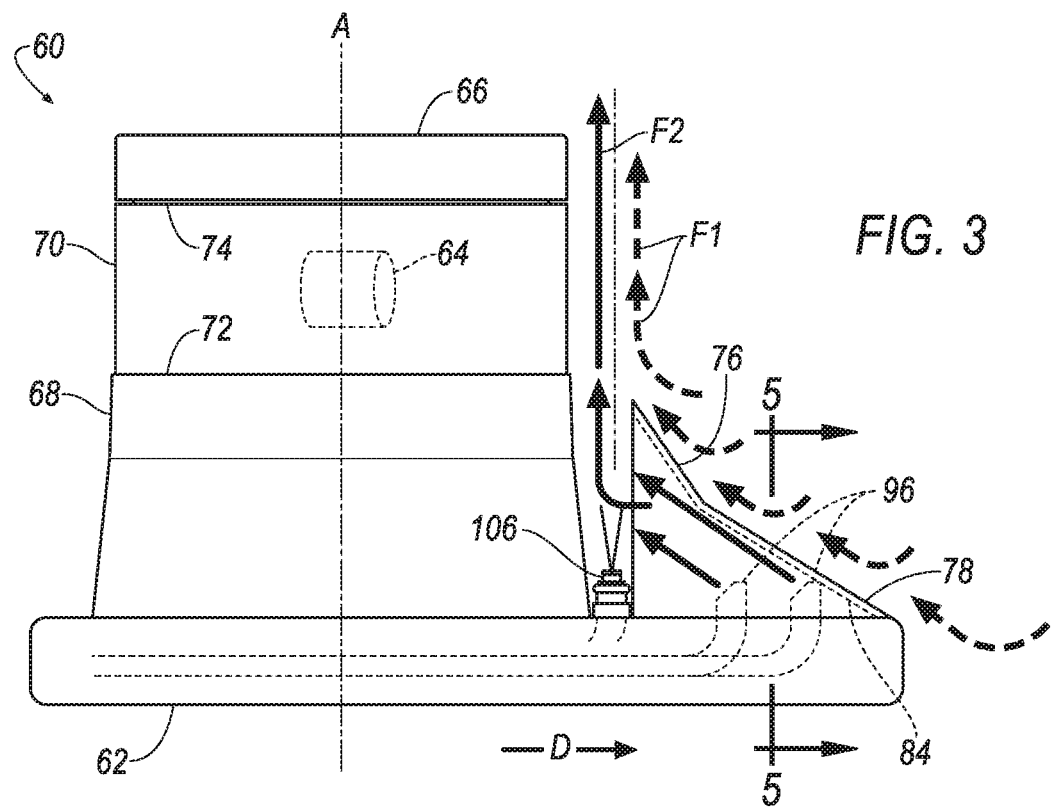
FIG. 3 is a side view of an example sensor assembly of the vehicle.

With reference to FIGS. 2-4, the sensor 64 of the sensor assembly 60 may be disposed inside the rest of the sensor assembly 60. The sensor 64 may be designed to detect features of the outside world; for example, the sensor 64 may be a radar sensor, a scanning laser range finder, a light detection and ranging (LIDAR) device, or an image processing sensor such as a camera. In particular, the sensor 64 may be a LIDAR device. A LIDAR device detects distances to objects by emitting laser pulses and measuring the time of flight for the pulse to travel to the object and back.

With reference to FIGS. 3 and 4, the mount 62 may be positioned below the sensor 64 and may support the sensor 64 and the rest of the sensor assembly 60. The mount 62 may extend below the side surface 68 and forward from the side surface 68. The mount 62 may be hollow to allow wiring, tubes, etc. to pass through the mount 62 while being shielded from the outside environment.

With reference to FIG. 3, the side surface 68 may include a sensor window 70. The sensor window 70 may also define the axis A. The sensor window 70 extends circumferentially about the axis A. The sensor window 70 may extend fully about the axis A, that is, 360°, or partially about the axis A. The sensor window 70 extends along the axis A from a bottom edge 72 to a top edge 74. The bottom edge 72 may be at the mount 62 or may be spaced from the mount 62 along the side surface 68. The top edge 74 may be at the top surface 66 or may be spaced from the top surface 66 along the side surface 68. The sensor window 70 is attached indirectly to the sensor 64 via the mount 62 and/or the side surface 68.

The sensor window 70 has a diameter. The diameter of the sensor window 70 may be the same as the rest of the side surface 68, if any; in other words, the sensor window 70 may be flush or substantially flush with the side surface 68. "Substantially flush" means a seam between the sensor window 70 and the rest of the side surface 68 does not cause turbulence in air flowing along the side surface 68.

At least some of the sensor window 70 is transparent with respect to whatever phenomena the sensor 64 is capable of detecting. For example, if the sensor 64 is a LIDAR device, then the sensor window 70 is transparent with respect to wavelengths of visible light transmitted by the laser of the LIDAR device.

With continued reference to FIG. 3, the sensor 64 has a field of view through the sensor window 70. The sensor window 70 has an obstructed portion and a viewing portion. The obstructed portion faces the vehicle 30, and the viewing portion faces away from the vehicle 30. In other words, the obstructed portion is the area of the sensor window 70 for which the sensor 64 is blocked by the vehicle 30 from detecting the external environment. The viewing portion is the area of the sensor window 70 through which the sensor 64 is able to detect the external environment without obstruction by the vehicle 30. If the sensor arm 58 extends from between the ends 48, 50 of the A pillar 36, as shown in FIG. 1, then the viewing portion may be approximately equal to or greater than 270°. The viewing portion includes a forward direction, i.e., a direction of travel D of the vehicle 30. The sensor window 70, as positioned in the sensor assembly 60 or as positioned relative to the sensor 64, defines the direction of travel D.

With reference to FIGS. 1 and 3-5, a deflector 76 is positioned outside the field of view. The deflector 76 may be supported by the mount 62. The deflector 76 may be spaced from the side surface 68 and the sensor window 70. The deflector 76 may be positioned in the direction of travel D from the sensor window 70, and the deflector 76 may be positioned below the sensor window 70, that is, in a vehicle-downward direction from the sensor window 70.

With reference to FIGS. 3 and 4, the deflector 76 may point forward, that is, in the direction of travel D. The deflector 76 may be wedge-shaped, that is, may be a wedge; for the purposes of this disclosure, a "wedge" is defined as a member that tapers from a thicker end to a thin edge. The deflector 76 may thus be angled downward in the direction of travel D.

The deflector 76 includes an outer surface 78 facing in the direction of travel D. The outer surface 78 of the deflector 76 may include an edge 80 running through the middle of the deflector 76. The edge 80 may define a line extending through the axis A. Alternatively, the edge 80 may define a curve that is concave upward, and the curve and the axis A may be in the same plane. The edge 80 may point downward and forward, in the direction of travel D. The deflector 76 may have two sides 82 divided by the edge 80. The sides 82 may be reflectionally symmetrical about the edge 80. The sides 82 may have each a triangular shape. The sides 82 may be planar or curved.

The deflector 76 is fixedly positioned on the mount 62 to deflect a first airflow F1 travelling in an opposing direction to the direction of travel D of the sensor window 70 to one or more directions tangential to the sensor window 70. (The adjectives "first" and "second" are used throughout this document as identifiers and are not intended to signify importance or order.) Specifically, the outer surface 78 of the deflector 76 is shaped to deflect the first airflow F1 to the one or more tangential directions. The first airflow F1 is an ambient airflow relative to the deflector 76. "Ambient" in this context means that the first airflow F1 originates from outside the vehicle 30. For example, if the vehicle 30 is traveling at 60 miles per hour into a headwind of 10 miles per hour, the first airflow F1 arrives at the deflector 76 at 70 miles per hour. The deflector 76, e.g., the sides 82 and edge 80 of the deflector 76, are angled downward in the direction of travel D, thus pushing the first airflow F1 upward as the first airflow F1 arrives at the sensor window 70. The outer surface 78 of the deflector 76 is also shaped to push the first airflow F1 sideways along the sensor window 70.

Figure 5:
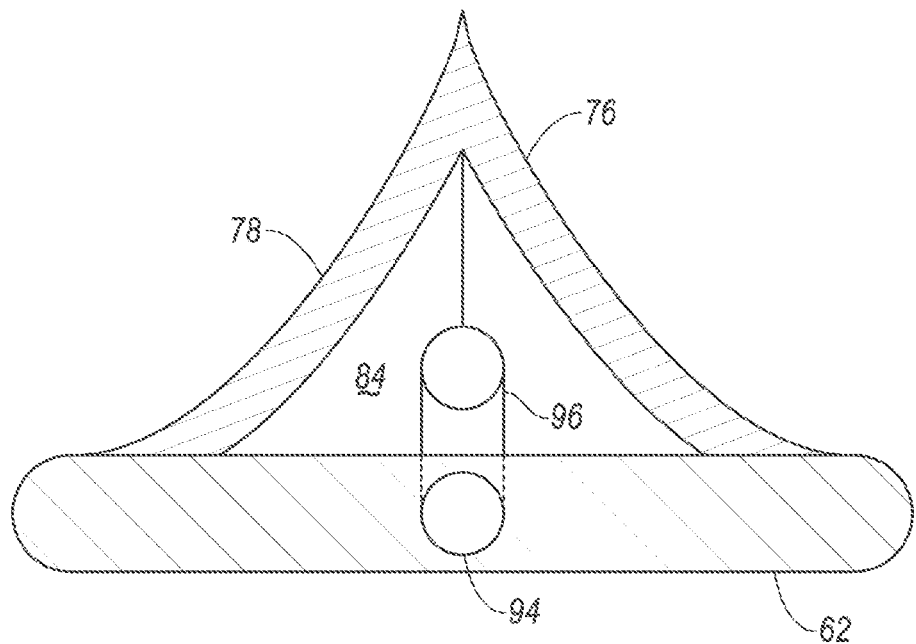
FIG. 5 is a cross-sectional view along line 5-5 in FIG. 3.

With reference to FIGS. 3 and 5, the deflector 76 has an inner surface 84. The inner surface 84 faces opposite the direction of travel D. The inner surface 84 may be substantially parallel to the outer surface 78. The inner surface 84 may be angled upward and backward opposite the direction of travel D, that is, forward and downward in the direction of travel D.

Figure 7:
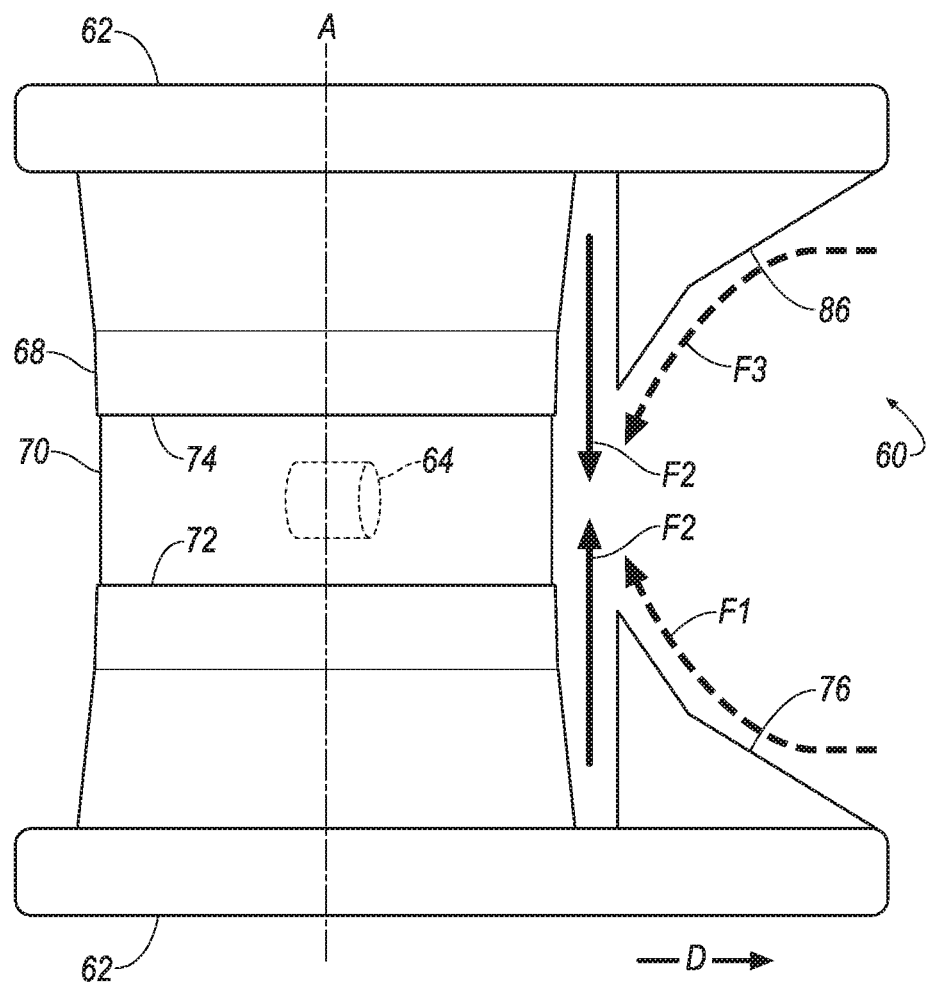
FIG. 7 is a side view of another example sensor assembly of the vehicle.

With reference to FIG. 7, the sensor assembly 60 may include a second deflector 86 fixedly positioned to deflect a third airflow F3 travelling in the opposing direction to the direction of travel D of the vehicle 30 to one or more directions tangential to the sensor window 70. The second deflector 86 may be positioned outside the field of view, and the field of view may be between the deflector 76 and the second deflector 86. The second deflector 86 may be shaped corresponding to the deflector 76. The second deflector 86 may be reflectionally symmetrical to the deflector 76 about a plane perpendicular to the axis A. Alternatively, instead of including the second deflector 86, the deflector 76 may be positioned above the sensor assembly 60 in the position of the second deflector 86 in FIG. 7.

Figure 6:
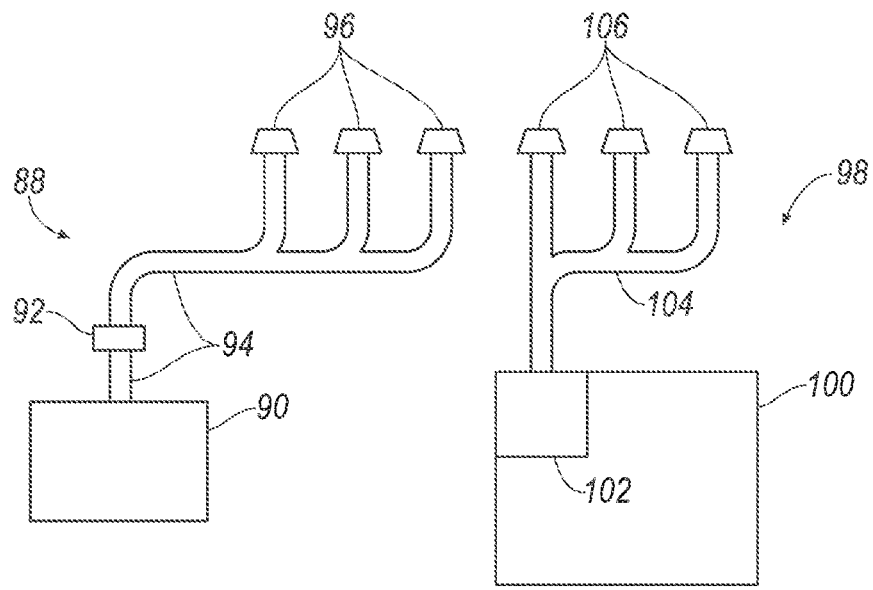
FIG. 6 is a diagram of an example cleaning system for the sensor assembly.

With reference to FIG. 6, an air system 88 of the vehicle 30 includes a compressor 90, a filter 92, air supply lines 94, and air nozzles 96. The compressor 90, the filter 92, and the air nozzles 96 are fluidly connected to each other (i.e., fluid can flow from one to the other) in sequence through the air supply lines 94.

The compressor 90 increases the pressure of a gas by reducing a volume of the gas or by forcing additional gas into a constant volume. The compressor 90 may be any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The filter 92 removes solid particulates such as dust, pollen, mold, dust, and bacteria from air flowing through the filter 92. The filter 92 may be any suitable type of filter, e.g., paper, foam, cotton, stainless steel, oil bath, etc.

With continued reference to FIG. 6, the air supply lines 94 extend from the compressor 90 to the filter 92 and from the filter 92 to the air nozzles 96. The air supply lines 94 may be, e.g., flexible tubes.

With reference to FIGS. 3-6, the sensor assembly 60 includes one or more air nozzles 96. The air nozzles 96 are fixedly positioned to direct a second airflow F2 through the air nozzles 96 to a space between the sensor window 70 and the deflector 76. The air nozzles 96 may be supported by and protrude from the mount 62. The air nozzles 96 are aimed at the inner surface 84 of the deflector 76. The inner surface 84 is shaped to deflect the second airflow F2 to the space between the sensor window 70 and the deflector 76. The deflector 76 is thus positioned to direct the second airflow F2 between the sensor window 70 and the first airflow F1. The second airflow F2 forms a boundary layer between the first airflow F1 and the sensor window 70, thus preventing debris carried in the first airflow F1 from impacting the sensor window 70.

With reference to FIG. 6, a liquid system 98 of the vehicle 30 includes a reservoir 100, a pump 102, liquid supply lines 104, and liquid nozzles 106. The liquid system 98 distributes washer fluid stored in the reservoir 100 to the liquid nozzles 106. "Washer fluid" refers to any liquid stored in the reservoir 100 for cleaning. The washer fluid may include solvents, detergents, diluents such as water, etc.

The reservoir 100 may be a tank fillable with liquid, e.g., washer fluid for window cleaning. The reservoir 100 may be disposed in a front of the vehicle 30, specifically, in an engine compartment forward of a passenger cabin. The reservoir 100 may store the washer fluid only for supplying the sensor assembly 60 or also for other purposes, such as supply to the windshield 44.

With continued reference to FIG. 6, the pump 102 may force the washer fluid through the liquid supply lines 104 to the liquid nozzles 106 with sufficient pressure that the washer fluid sprays from the liquid nozzles 106. The pump 102 is fluidly connected to the reservoir 100. The pump 102 may be attached to or disposed in the reservoir 100.

With reference to FIGS. 3-6, the sensor assembly 60 includes one or more liquid nozzles 106. The liquid nozzles 106 are fixedly positioned to eject liquid into the space between the sensor window 70 and the deflector 76, which may be accomplished by ejecting liquid into the second airflow F2. The liquid nozzles 106 may be supported by and protrude from the mount 62. The liquid nozzles 106 may be aimed at the space between the deflector 76 and the sensor window 70. The second airflow F2 may draw in the washer fluid ejected from the liquid nozzles 106 and distribute the washer fluid onto the sensor window 70. When the liquid nozzles 106 are no longer ejecting washer fluid, the second airflow F2 may dry the washer fluid left on the sensor window 70.

With reference to FIG. 2, the computer 32 is a microprocessor-based computer. The computer 32 includes a processor, memory, etc. The memory of the computer 32 includes memory for storing instructions executable by the processor as well as for electronically storing data and/or databases. The computer 32 may be a single computer or may be multiple computers in communication with one another.

The computer 32 may transmit signals through a communications network 108 such as a controller area network (CAN) bus, Ethernet, WiFi, Local Interconnect Network (LIN), onboard diagnostics connector (OBD-II), and/or by any other wired or wireless communications network. The computer 32 may be in communication with the sensor 64, the compressor 90, and the pump 102 via the communications network 108.

The computer 32 may be programmed to instruct the compressor 90 to generate the second airflow F2 through the air nozzles 96 when the vehicle 30 is in operation. The computer 32 may be programmed to instruct the compressor 90 to generate the second airflow F2 at an airflow speed. The airflow speed may be based on a speed of the sensor window 70, that is, a speed of the vehicle 30, in the direction of travel D. The memory of the computer 32 may store a table relating a plurality of speeds of the vehicle 30 to a plurality of the airflow speeds. The airflow speeds may be determined by, e.g., wind tunnel testing to determine, for a given speed of the vehicle 30, the airflow speed that generates a boundary layer and minimizes the separation of the boundary layer from the sensor window 70.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An apparatus, comprising:
   a sensor window;
   a deflector fixedly positioned to deflect a first airflow travelling in an opposing direction to a direction of travel of the sensor window to one or more directions tangential to the sensor window; and
   a nozzle fixedly positioned to direct a second airflow through the nozzle to a space between the sensor window and the deflector;
   wherein the deflector includes an outer surface shaped to deflect airflow from the opposing direction to the one or more tangential directions;
   the outer surface includes an edge and two sides extending transverse to each other from the edge;
   the sides each have a triangular shape and are reflectionally symmetrical about the edge; and
   the sides extend in different directions that are each away from the edge and in the opposing direction to the direction of travel.

2. The apparatus of claim 1, wherein the deflector has an inner surface.

3. The apparatus of claim 2, wherein the nozzle is positioned to direct the second airflow at the inner surface, and the inner surface is shaped to deflect the second airflow to the space between the sensor window and the deflector.

4. The apparatus of claim 3, wherein the deflector is positioned to direct the second airflow between the sensor window and the first airflow.

5. The apparatus of claim 1, wherein the deflector is wedge-shaped.

6. The apparatus of claim 1, wherein the sensor window is cylindrical and defines an axis, and the edge defines a line extending through the axis.

7. The apparatus of claim 1, further comprising a filter fluidly connected to the nozzle, and a compressor fluidly connected to the nozzle.

8. The apparatus of claim 7, further comprising a computer in communication with the compressor, wherein the computer is programmed to instruct the compressor to generate the second airflow through the nozzle at an airflow speed based on a speed of a vehicle including the sensor window.

9. The apparatus of claim 1, wherein the nozzle is an air nozzle, further comprising a liquid nozzle fixed relative to the sensor window and positioned to eject liquid into the second airflow.

10. The apparatus of claim 9, wherein the liquid nozzle is positioned to eject liquid into the space between the sensor window and the deflector.

11. The apparatus of claim 1, further comprising a sensor attached to the sensor window, wherein the sensor has a field of view through the sensor window, and the deflector is positioned outside the field of view.

12. The apparatus of claim 11, wherein the deflector is a first deflector, further comprising a second deflector fixedly positioned to deflect a third airflow travelling in the opposing direction to the direction of travel of the sensor window to one or more directions tangential to the sensor window, wherein the second deflector is positioned outside the field of view, and the field of view is between the first deflector and the second deflector.

13. A vehicle, comprising:
    a sensor window;
    a sensor arm supporting the sensor window;
    a wedge spaced from the sensor window and positioned in a vehicle-forward direction from and one of above and below the sensor window, the wedge including an outer surface facing the vehicle-forward direction and an inner surface facing opposite the vehicle-forward direction; and
    a nozzle aimed at the inner surface;
    wherein the outer surface is shaped to deflect airflow from a vehicle-rearward direction to one or more directions tangential to the sensor window;
    the outer surface includes an edge and two sides extending transverse to each other from the edge;
    the sides each have a triangular shape and are reflectionally symmetrical about the edge; and
    the sides extend in different directions that are each away from the edge and in the vehicle-rearward direction.

14. The vehicle of claim 13, wherein the sensor window is cylindrical and defines an axis extending vertically.

15. The vehicle of claim 13, further comprising a filter fluidly connected to the nozzle, and a compressor fluidly connected to the nozzle.

16. The vehicle of claim 15, further comprising a computer in communication with the compressor, wherein the computer is programmed to instruct the compressor to generate airflow through the nozzle at an airflow speed based on a speed of a vehicle including the sensor window.

17. The vehicle of claim 13, wherein the nozzle is an air nozzle, further comprising a liquid nozzle aimed at a space between the wedge and the sensor window.

18. The vehicle of claim 13, further comprising a sensor attached to the sensor window, wherein the sensor has a field of view through the sensor window, and the wedge is positioned outside the field of view.

* * * * *